March 20, 1934.  R. A. CURRAN  1,951,790
METHOD AND APPARATUS FOR TREATING ASPHALT
Filed May 31, 1930
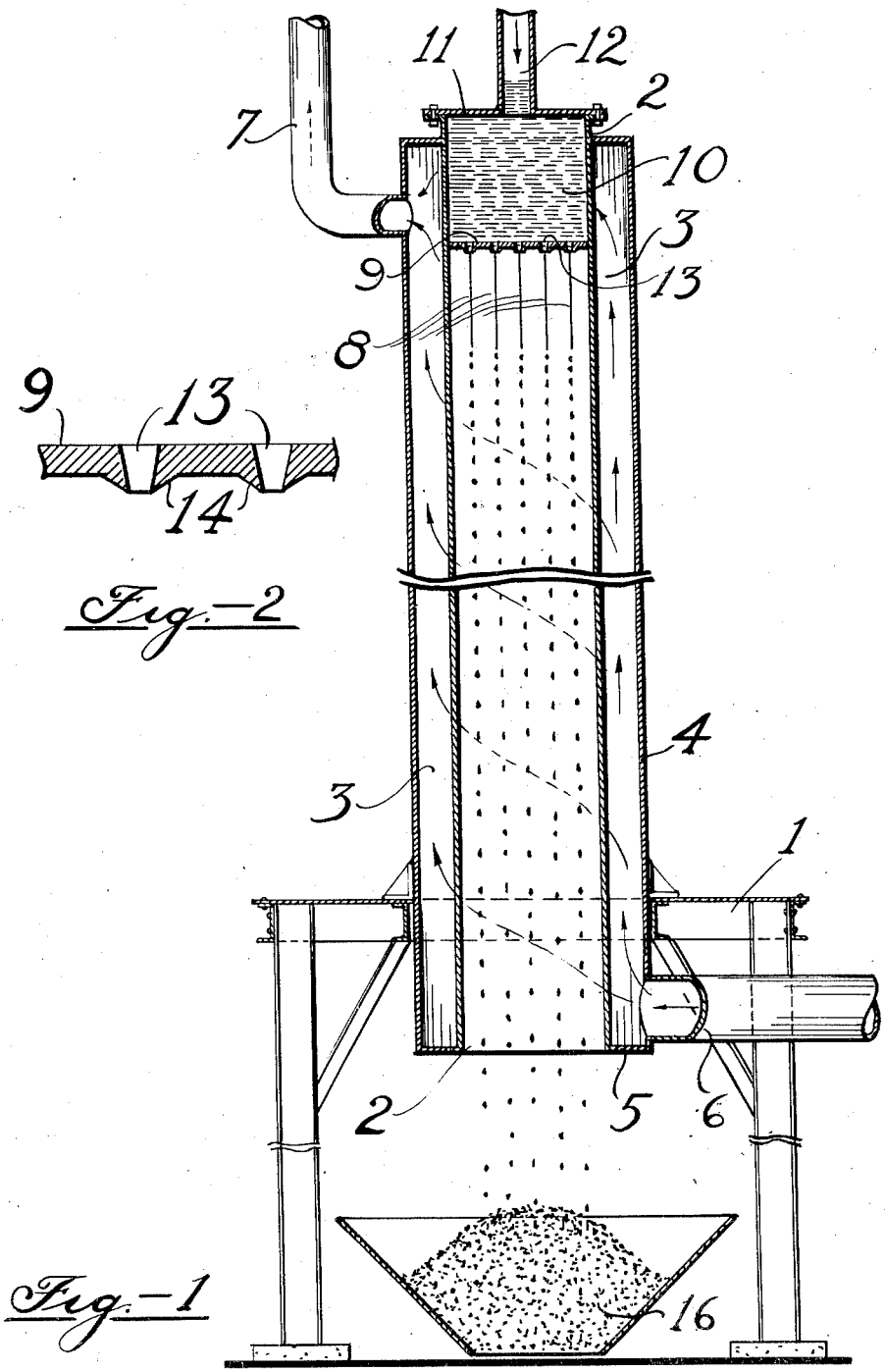

Patented Mar. 20, 1934

1,951,790

UNITED STATES PATENT OFFICE 1,951,790

METHOD AND APPARATUS FOR TREATING ASPHALT

Roy A. Curran, Bayonne, N. J., assignor to Standard Oil Development Company, a corporation of Delaware Application May 31, 1930, Serial No. 458,586

5 Claims. (Cl. 83—91)

This invention relates to the treatment of bituminous material and more particularly to the division of bituminous bodies into relatively small particles. The invention will be fully understood from the following description taken in connection with the accompanying drawing, in which latter Figure 1 is a vertical section through an apparatus employed in the practice of the invention. Figure 2 is a detail of a portion of the apparatus shown in Figure 1.

In the drawing, a tubular vertical tower of suitable height is shown supported upon a framework 1. The vertical tower comprises a tubular shell 2 which is open at its bottom. The side walls of the shell are surrounded by an annular chamber 3 constituted by the jacket 4 and end wall 5. A conduit 6 opens into the chamber from a suitable source of hot gases such as a furnace, not shown. A discharge conduit 7 leads from the chamber to a suitable place of disposal.

Melted asphalt is adapted to be introduced into the upper portion of the tower in a plurality of spaced streams 8. This is effected by means of a perforated plate 9 which extends transversely across the upper portion of the shell 2 in spaced relation to the upper end of the shell. The plate 9 forms a container 10 with the walls of the shell 2 and with the end wall 11. A conduit 12 opens into the container 10 from any suitable source of melted asphalt not shown. A plurality of perforations 13 are formed in plate 9 with the side walls of the perforations converging downwardly toward the underside, or delivery side, of the plate. The portions of the under side of the plate 9 adjoining the perforations 13 are thickened as indicated at 14. This construction facilitates the delivery of melted asphalt in a plurality of continuous streams from the plate 9. The tower is formed of sufficient height that the streams of melted asphalt falling therethrough will be broken up by contact with the gaseous medium, such as air, contained within the tower during passage through the tower. The gases passing through the annular chamber heat the gaseous medium within the tower sufficiently to maintain the streams of melted asphalt in a melted condition until the streams have formed into droplets.

A receiver 16 is disposed directly beneath the tower in spaced relation thereto. The space between the receiver and the tower constitutes a cooling zone containing gaseous medium such as air. The drops of asphalt in passing through this cooling zone are solidified by contact with the relatively cool air. In the preferred construction, a free circulation of atmospheric air is permitted between the receiver and tower. It will be understood that other means for cooling the gaseous medium in this space can be used, if desired.

While the invention has been described as applied to the formation of relatively small particles of asphalt, it will be understood that other bituminous materials can be similarly treated as well as such materials as commercial pitch from any source, grease and the like which can be melted into fluid form. It is intended to include such materials in the scope of the appended claims.

Various changes may be made within the scope of the appended claims, in which it is desired to claim all novelty inherent in the invention as broadly as the prior art permits.

I claim:

1. An apparatus for treating asphalt, comprising a receiver, a tubular shell open at the bottom, means for supporting the shell in a substantially vertical position directly above and in spaced relation to the receiver, an annular chamber enclosing the side walls of the shell, means for circulating fluid through the chamber, and means for introducing liquid in a plurality of streams into the upper portion of the shell.

2. An apparatus for treating asphalt, comprising a receiver, a tubular shell open at the bottom and having closed sidewalls, means for supporting the shell in a substantially vertical position directly above and in spaced relation to the receiver, an annular chamber enclosing the side walls of the shell, means for circulating fluid through the chamber, and a perforated plate extending transversely across the upper portion of the shell.

3. An apparatus for treating asphalt, comprising a receiver, a tubular shell open at the bottom, means for supporting the shell in a substantially vertical position directly above and in spaced relation to the receiver, an annular chamber enclosing the side walls of the shell, means for circulating fluid through the chamber, and a container for liquid extending across the interior of the upper portion of the shell and provided with a plurality of downwardly facing discharge openings.

4. An apparatus for treating asphalt, comprising a receiver, a tubular shell open at the bottom, means for supporting the shell in a substantially vertical position directly above and in spaced relation to the receiver, an annular chamber enclosing the side walls of the shell, means for circulating fluid through the chamber, and a container for liquid disposed in the upper portion of the shell and provided with a plurality of downwardly facing discharge openings the walls of which converge toward the under side of the container.

5. The method of treating bituminous materials, which comprises causing continuous streams of melted bituminous material to fall into a column of hot non-aqueous gaseous medium, maintaining the streams in melted condition by contact with the hot gaseous medium until the streams break into drops, and congealing the drops by contacting them with a relatively cool non-aqueous gaseous medium.

ROY A. CURRAN.